March 19, 1940. B. LAZICH ET AL 2,193,905

TIME MEASURING APPARATUS

Filed Jan. 23, 1937 2 Sheets-Sheet 1

INVENTORS
Branko Lazich and
BY Harry F. Ashworth.

THEIR ATTORNEY

Patented Mar. 19, 1940

2,193,905

UNITED STATES PATENT OFFICE 2,193,905

TIME MEASURING APPARATUS

Branko Lazich, Penn Township, Allegheny County, and Harry E. Ashworth, Wilkinsburg, Pa., assignors to The Union Switch & Signal Company, Swissvale, Pa., a corporation of Pennsylvania Application January 23, 1937, Serial No. 122,046

19 Claims. (Cl. 246—130)

Our invention relates to time measuring apparatus, and particularly to electrically operated time measuring apparatus.

More specifically, an object of our invention is the provision of novel and improved means for checking the operation of time measuring apparatus adaptable of movement away from an initial position during the lapsed time of an event, such as, for example, the time required to complete a desired operation; and which apparatus is then automatically restored to its initial position at a predetermined rate of movement, a desired control being effected by the apparatus over other devices during the restoring movement. Other features and advantages of our invention will appear as the specification progresses.

We will describe two forms of apparatus embodying our invention, and will then point out the novel features thereof in claims.

Apparatus embodying our invention is particularly useful in time measuring apparatus employed in control systems for highway signals located at the intersection of a railway and a highway at grade, and by which control system the warning period of a highway crossing signal prior to the arrival of a train at the intersection is substantially uniform over a wide range of train speeds. It will be understood that our invention is not limited to this one application of time measuring apparatus, and it will be useful at many places where time measuring apparatus of the type here contemplated is employed.

In the accompanying drawings.

In each of the several views, like reference characters designate similar parts.

The time measuring device to which we have applied the checking apparatus embodying our invention by way of illustration and the operating circuits for the time measuring device were not invented by us, our present invention as above stated consisting only in an improvement which involves the checking of the speed of operation of the time measuring device and causing the warning operation of the highway crossing signal in the event said device fails to operate at its predetermined speed.

Figure 1:
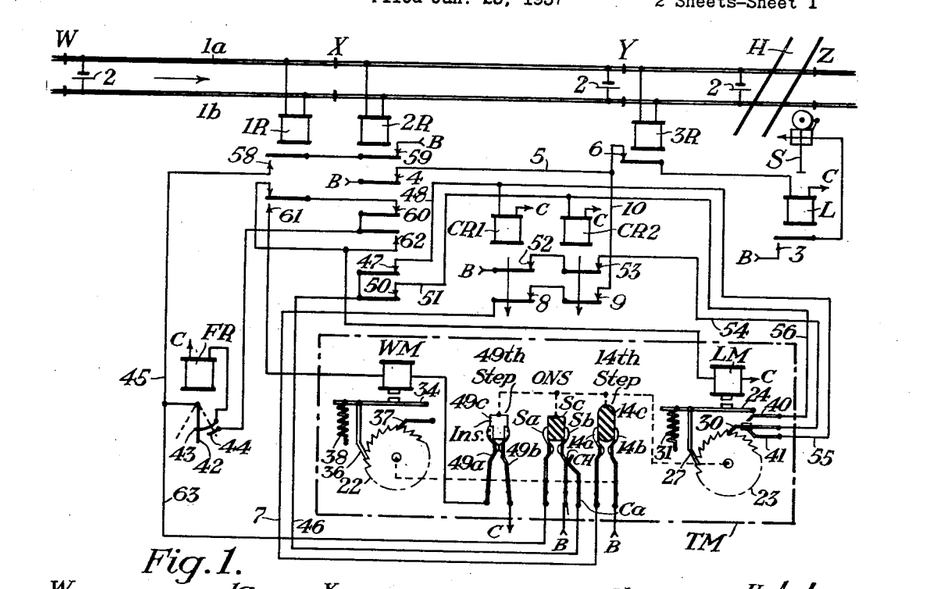
Figs. 1 and 2 are diagrammatic views of two different forms of apparatus each embodying our invention, which apparatus is applied in each case to a control system for a highway crossing signal.

Referring to Fig. 1, the reference characters $1a$ and $1b$ designate the track rails of a stretch of railway over which traffic normally moves in the direction indicated by an arrow, and which is intersected at grade by a highway H. A highway crossing signal S is located adjacent the intersection. The signal S may be any standard form of highway crossing signal, and, as here shown, is an audible signal in the form of an electric bell.

Preferably, the track rails $1a$ and $1b$ are divided by the usual insulated rail joints to form three track sections W—X, X—Y and Y—Z, which sections are traversed successively in the order named as the train approaches the highway. Each section is provided with a track circuit consisting of a source of current such as a battery 2 connected across the rails at one end of the section and a track relay designated by the reference character R, with the distinguishing exponent, connected across the rails at the opposite end of the section.

For the purpose of this description, we shall refer to the section W—X as a measuring track section, section X—Y as a first operating section and Y—Z as a second or positive operating section. As will appear hereinafter, the speed of a train as it traverses the section W—X is determined by measuring the time consumed by the train in advancing through the section. The signal S is set into operation in accordance with the measured time after the train enters the first operating section X—Y, and positive operation of the signal S occurs when the train occupies the section W—Z.

In order to more easily understand our invention, we shall assume that the maximum speed for all trains approaching the highway H is 90 miles per hour and that 20 seconds warning operation of the highway crossing signal prior to the arrival of the train at the intersection is desired. A train moving at 90 miles per hour advances 132 feet per second and the combined length of the sections X—Y and Y—Z is made 2640 feet ($132 \times 20$), since operation of the signal is initiated when a train enters the section X—Y, unless the warning period is delayed through the medium of a time measuring device to be referred to later. The section Y—Z is preferably short, and by virtue of this section operation of the signal S while the train is at the intersection is assured. To agree with the above assumed train speeds and warning period, the measuring section W—X is preferably 2640 feet in length.

The immediate control of the signal S is effected through the medium of a control relay L, the arrangement being such that when relay L is released, closing its back contact 3, an operating circuit for the signal is completed and the signal sounds a warning, but, when the relay L is energized and picked up, the signal S is silent. The relay L, in turn, is governed jointly by the track relays 2R and 3R, together with a time measuring device designated as a whole by the reference character TM and checking relays CR1 and CR2. The control circuit for relay L may be traced from the B terminal of any convenient source of current, such as a battery not shown, over front contact 4 of relay 2R, line wire 5, front contact 6 of relay 3R, winding of relay L, and to the C terminal of the current source. A branch path which shunts around the front contact 4 of relay 2R is provided, which path extends from the B terminal over the 14th step contact of the time measuring device TM when closed in a manner to appear hereinafter, wire 7, front contacts 8 and 9 of the checking relays CR1 and CR2, respectively, and thence by wire 10 to the wire 5. It follows that, when both sections X—Y and Y—Z are unoccupied and the track relays 2R and 3R are picked up, relay L is energized and the signal S is silent; when section X—Y is occupied and section Y—Z is unoccupied, the relay L is released and the signal S is operated, unless the time measuring device TM has operated to close its 14th step contact and the two checking relays CR1 and CR2 are picked up; and when the section Y—Z is occupied and the relay 3R is released, the relay L is deenergized and the signal S is sounded irrespective of the time measuring device and checking relays.

Figure 3:
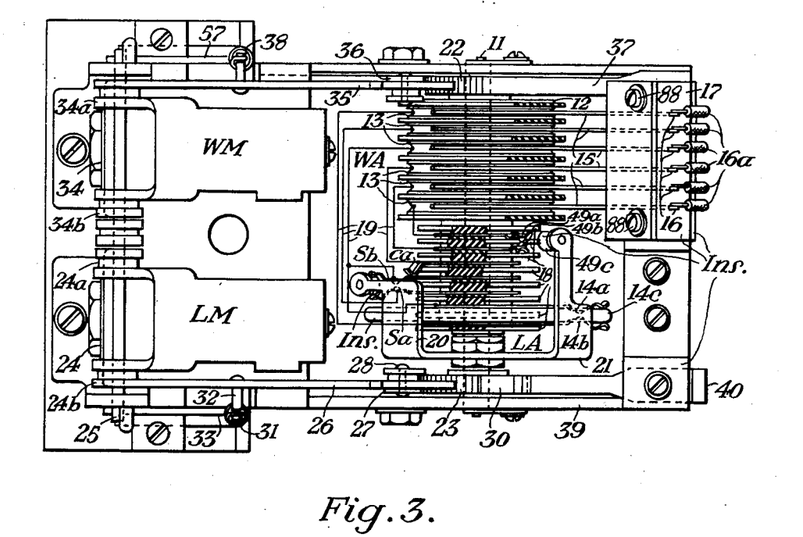
Figs. 3 and 4 are inverted plan and elevation views, respectively, partly in section, of a time measuring device that may be employed with the apparatus of Figs. 1 and 2.
Figure 4:
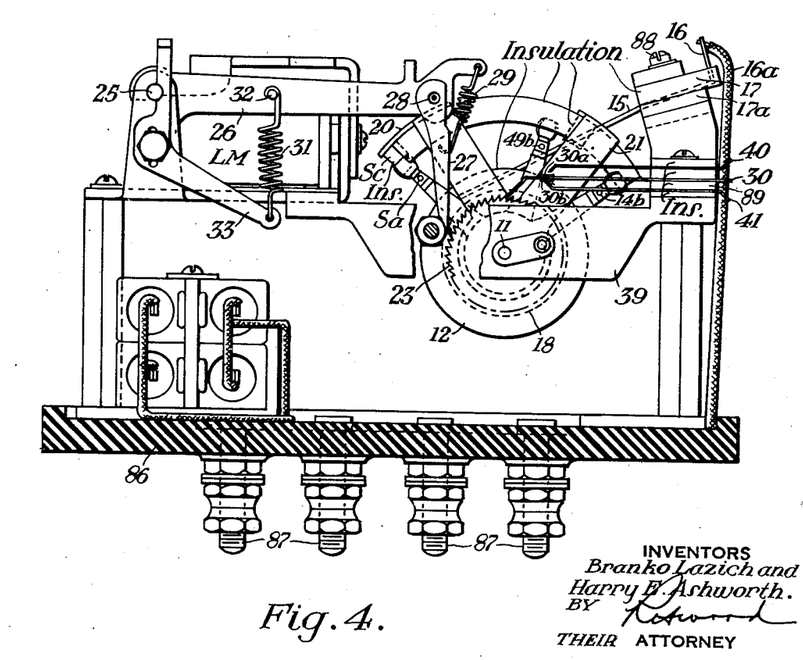

The time measuring device TM may take different forms, among them being that disclosed in Figs. 3 and 4.

Looking at Figs. 3 and 4, the time measuring device TM comprises two operating units which are mounted in a framework 39 secured by screws not shown to a top plate 86 of suitable insulation material. The top plate 86 also has mounted therein standard terminal posts 87 for making connections with outside circuits. The top plate 86 would be mounted on a suitable dust and weather proof case not shown such as is commonly provided for electrically operated devices of this type. A first one of the two units of the device TM includes as its essential elements a motor magnet WM and a wiper contact assembly WA. The second unit includes as its essential elements a motor magnet LM and a contact actuating lever assembly LA. The wiper assembly WA includes an insulation drum 12 and a series of insulation discs 18. The drum 12 and discs 18 are clamped together and mounted for rotation in unison around an axis 11 which is suitably journalled in the frame work 39. The surface of the drum 12 is formed with grooves in which brass slip rings 13 are secured, each of which rings has engaging therewith a wire spring brush 15, there being one brush for each slip ring. The several brushes 15 are held at their outer ends between two insulation blocks 17 and 17a which are secured to the frame 39 by screws 88. Each such brush 15 is formed with a terminal 16 to which a lead wire 16a may be fastened as by soldering and connected to a definite one of the terminal posts 87.

A series of circuit controlling contact wipers or fingers, to be shortly described, are spaced between the insulation discs 18, and these contact fingers are connected by lead wires 19 to the slip rings 13, each contact finger being connected to a particular slip ring. In Fig. 3 these lead wires 19 are shown for the sake of clearness as outside of the discs 18 and drum 12, but it will be understood that in actual practice these lead wires would pass through holes drilled in the discs and drum and would not interfere when the wiper assembly WA is rotated about the axis 11 in a manner to be later described.

Looking at Fig. 1 as well as at Figs. 3 and 4, these contact fingers spaced in the insulation discs 18 are disposed to form circuit controlling contacts designated by the reference characters 14th step contact, 49th step contact, synchronous contact ONS and check contact CH. The 14th step contact includes two resilient contact fingers 14a and 14b biased by their own spring action to engage, completing a circuit connection therethrough. The contact fingers 14a and 14b are formed at the outer end to cooperate with an insulation contact actuating member 14c to be later described, which member 14c when moved between the contact fingers 14a and 14b forces the fingers apart, opening the circuit connection. The 49th step contact likewise includes two resilient contact fingers 49a and 49b biased to an engaging position and formed at their outer end to cooperate with an insulation contact actuating member 49c also to be described later, which member when moved between the contact fingers 49a and 49b forces them apart to open the circuit connection. Again, the synchronous contact ONS consists of two resilient contact fingers Sa and Sb biased to an engaging position and formed to cooperate with an insulation contact actuating member Sc, which, when moved between the contact fingers Sa and Sb, forces them apart, opening the contact. The check contact CH includes a contact finger Ca adapted to engage the contact finger Sb of the synchronous contact ONS when the finger Sb has been moved by the actuating member Sc. Each of the contact fingers 14a, 14b, 49a, 49b, Sa, Sb and Ca is connected by means of a lead wire 19 with a particular one of the slip rings 13 as pointed out hereinbefore. It follows that each of the contact fingers is electrically connected with a corresponding terminal 16, whatever its angular position about the axis 11, and in turn is connected with a particular terminal post 87.

The contact actuating lever assembly LA includes two radially extending arms 20 and 21 secured together and mounted for rotation about the axis 11. The outer ends of the arms 20 and 21 are each formed to extend parallel with the axis 11, and carry the insulation contact actuating members Sc and 49c, respectively. The insulation contact actuating member Sc is positioned on the arm 20 to cooperate with the contact fingers Sa and Sb, in a manner explained above, and the insulation contact actuating member 49c is positioned on the arm 21 to cooperate with the contact fingers 49a and 49b. The insulation contact actuating member 14c is made of some length and is mounted on both the arms 20 and 21 and in a position to cooperate with the contact fingers 14a and 14b of the 14th step contact. The function of these several contacts will appear when the operation of the system is described.

The wiper assembly WA and the lever assembly LA are actuated step-by-step by the respective motor magnets WM and LM through the medium of ratchet wheels 22 and 23, respectively. The motor magnet LM is provided with an armature 24 journalled at 24a and 24b on an armature shaft 25. The armature 24 carries rigid therewith an operating arm 26, which, in turn, carries a propelling pawl 27. The propelling pawl 27 is pivoted at 28 on the outer end of the arm 26 and is biased by means of a spring 29, carried on the operating arm 26, to a position in which the lower end of the propelling pawl engages a tooth of the ratchet wheel 23. The ratchet wheel 23 is free to rotate on the axis 11 and is in fixed relation with the arms 20 and 21 of the lever assembly LA. Also cooperating with the ratchet wheel 23 is a retaining pawl 30, which permits rotation of the ratchet wheel 23 in one direction only, that is, in a counterclockwise direction, as viewed in Fig. 4. A drive spring 31 is secured between a pin 32 on the operating arm 26 and a fixed support 33. When the motor magnet LM becomes energized the armature 24 is attracted toward the right, as viewed in Fig. 4, thereby raising the operating arm 26 and the propelling pawl 27 against the force of the drive spring 31. When the motor magnet LM becomes deenergized, the drive spring 31 draws the operating arm 26 and the propelling pawl 27 downward, thereby stepping the ratchet wheel 23 one step in a counterclockwise direction. It follows that periodic energization of the motor magnet LM is effective to rotate the ratchet wheel 23, and the lever assembly LA step-by-step in a counterclockwise direction around the axis 11. The parts are so proportioned that 50 steps make one full revolution.

The motor magnet WM is provided with an armature 34 journalled at 34a and 34b on the armature shaft 25, to which armature an operating arm 35 is rigidly secured. The operating arm 35 carries on its outer end a propelling pawl 36 adapted to engage a tooth of the ratchet wheel 22, in the same manner as the propelling pawl 27 engages a tooth of the ratchet wheel 23. The ratchet wheel 22 is free to rotate on the axis 11 and is in fixed relation with the wiper assembly WA. A retaining pawl 37 permits rotation of the ratchet wheel 22 in one direction only, that is, in the counterclockwise direction, as viewed in Fig. 4. A drive spring 38 is secured between the operating arm 35 and a fixed support 57 in the same manner the spring 31 is secured to arm 26. Consequently, when the motor magnet WM is periodically energized, the ratchet wheel 22 and the wiper assembly WA are rotated step-by-step around the axis 11 in a counterclockwise direction. The parts are so proportioned that 50 steps make one complete revolution of the wiper assembly.

The relationship between the movements of the wiper assembly WA and the lever assembly LA will now be described. The normal or synchronous position of the two assemblies is that illustrated in the drawings, the two associated motor magnets WM and LM being inactive. In this synchronous position the contact actuating member Sc of the assembly LA occupies the position between the conact fingers Sa and Sb of the assembly WA to open the synchronous contact ONS, the contact actuating member 14c of the assembly LA is positioned between contact fingers 14a and 14b of the assembly WA to open the 14th step contact, the contact actuating member 49c of the assembly LA is positioned out of engagement with the contact fingers 49a and 49b of the assembly WA and the 49th step contact is closed, and the contact finger Ca engages the contact finger Sb to close the check contact CH. With the assembly LA remaining stationary and the motor magnet WM energized to operate the assembly WA one step away from the synchronous position, the contact fingers Sa and Sb advance away from the member Sc and the synchronous contact ONS is closed. When the contact finger Sb moves off the member Sc at the end of the first step, it springs away from the contact finger Ca and the check contact CH is opened. With the assembly LA remaining stationary and the assembly WA operated 14 steps away from the synchronous position, the contact fingers 14a and 14b advance away from the member 14c and the 14th step contact is closed. When the assembly WA is operated 49 steps away from the synchronous position, that is, one step prior to a full revolution, the contact fingers 49a and 49b move into the position where the member 49c passes between these two contact fingers and the 49th step contact is opened. As will shortly appear, one side of the circuit for the motor magnet WA includes the 49th step contact, and thus the operation of the motor magnet WM and of the assembly WA is stopped just prior to one full revolution if not stopped prior to the 49th step by the associated control apparatus to be later described.

On the assumption that the motor magnet WM has operated the assembly WA to the 49th step and the operation stopped, operation of the motor magnet LM steps the lever arm assembly LA around 49 steps to the position where the member Sc passes between the contact fingers Sa and Sb to open the synchronous contact ONS, the contact ONS being included in the circuit for the motor magnet LM as will be shortly pointed out. With the synchronous position of the two assemblies restored the constant finger Ca engages the contact finger Sb and the check contact CH is closed. As a matter of fact, operation of the assembly WA to any intermediate position between the synchronous position and the 49th step position and the operation then stopped, when followed by operation of the motor magnet LM drives the lever assembly LA until the member Sc passes between the contact fingers Sa and Sb to open the synchronous contact ONS. It is to be noted that the 14th step contact is closed when the assembly WA is operated 14 steps away from the synchronous position and then remains closed until the lever assembly LA is subsequently operated and reaches a point 14 steps from the synchronous position. That is, the 14th step contact is closed when the two asemblies WA and LA occupy a predetermined position with respect to each other. Again, it is to be noted that the check contact CH is closed only at the synchronous position.

Referring again to Fig. 1, periodic impulses of current for operating the motor magnets WM and LM are supplied through the medium of an oscillator or flasher relay FR, which device may be any one of several well-known types. As here shown, the armature 42 of the relay FR is biased to a mid position where it engages a contact 43. When the winding of the relay FR is energized, armature 42 is swung to the left, as viewed in Fig. 1, breaking engagement with the contact 43 and deenergizing the winding of the relay. The armature 42 is now swung to the right under the influence of the biasing element to reestablish the contact 42—43 and reenergize the winding of the relay. The armature 42, on its swing to the right, will move past the mid position due to the inertia of the parts and make connection with the second contact 44, which contact is interposed in the circuit for the motor magnets WM and LM, as will shortly appear. It follows that, with current supplied to the relay FR, the armature of the relay is operated at a predetermined rate, making engagement with the contact 44 once each cycle of operation. To agree with the train speeds and length of track sections as sumed hereinbefore, the relay FR is preferably proportioned and adjusted to make 40 cycles of operation per minute, that is, one operation each one and one-half seconds.

In accordance with our invention, we propose to check the operation of the time measuring device TM, and to that end two checking relays CR1 and CR2, and a pair of contacts operated by the ratchet wheel 23 are provided, as well as the check contact CH. The retaining pawl 30 associated with the ratchet wheel 23 is mounted on an insulation block 89 (see Fig. 4) secured to the frame 39 of the time measuring device, and is made to function as a contact element having contacts 30a and 30b. Mounted on the insulation block 89, spaced apart from the retaining pawl or contact element 30, are two contact fingers 40 and 41. The arrangement is such that when the retaining pawl 30 is down at the bottom of the teeth of the ratchet wheel 23, the pawl 30 makes engagement with the contact finger 41, completing a circuit connection therethrough. When the ratchet pawl 23 is raised to the top of a tooth of the ratchet wheel 23, the pawl 30 is lifted out of engagement with the contact finger 41 and into engagement with the contact finger 40. Consequently, as long as the ratchet wheel 23 is stationary, the contact 30—41 is closed, but, when the ratchet wheel is operated in response to operation of the motor magnet LM, the contacts 30—41 and 30—40 are alternately closed.

The checking relays CR1 and CR2 are normally retained energized over a pickup circuit including the check contact CH of the device TM, which circuit extends from the B terminal of the current source over check contact CH, wire 46, and thence over front contact 47 of relay 2R, wire 48, winding of relay CR1 and of C terminal for the relay CR1; and from wire 46 over front contact 50 of relay 2R, wire 51, winding of relay CR2, and to the C terminal for the relay CR2. The checking relays CR1 and CR2 are retained energized subsequent to the operation of the wiper assembly WA away from the synchronous position, opening the check contact CH, by means of a stick circuit, which stick circuit can be traced from the B terminal over front contacts 52 and 53 of relays CR1 and CR2, respectively, wire 54, contact 30—41, wires 55 and 48, winding of relay CR1, and to the C terminal; and extending from wire 48 over front contacts 47 and 50, in series, of relay 2R, wire 51, winding of relay CR2 and to the C terminal. When the motor magnet LM is operated to drive the ratchet wheel 23, the relays CR1 and CR2 are alternately supplied with current impulses, the circuit for relay CR1 including the front contacts 52 and 53 and the contact 30—41, and the circuit for the relay CR2 including front contacts 52 and 53 and the contact 30—40. The relays CR1 and CR2 are each provided with slow release characteristics, and hence periodic energization thereof in response to operation of the ratchet wheel 23 causes the relays to remain picked up, but failure of the ratchet wheel 23 to be operated at a time when the track relay 2R is released, opening front contacts 47 and 50, causes one of the relays CR1 or CR2 to be deenergized and released at the end of its slow release period. With either relay CR1 or CR2 released, the stick circuit for the two relays is opened and the other relay becomes deenergized and is released. It is clear that the checking relays CR1 and CR2 can be initially energized only in the event the time measuring device TM is restored to the synchronous position, closing the check contact CH, and these checking relays are retained energized during the period the track relay 2R is released, only if the ratchet wheel 23 and the assembly LA are operated by the motor magnet LM at the predetermined rate.

Normally, that is, when the track sections W—X, X—Y and Y—Z are all unoccupied, the track relays 1R, 2R and 3R are picked up and the time measuring device TM occupies its synchronous position, that is, the position illustrated in Fig. 1. Under this normal condition, the control relay L is energized and the signal S is silent. Furthermore, the checking relays CR1 and CR2 are both picked up over the circuit including the check contact CH.

In describing the operation of the system of Fig. 1, we shall first assume that a train operating at the relatively low speed of 24 miles per hour, or approximately 35 feet per second, approaches the intersection form the left. This train, upon entering the track section W—X, shunts the track relay 1R, and that relay, upon releasing and causing back contact 58, completes a circuit for the flasher relay FR, which circuit includes B terminal, front contact 59 of relay 2R, back contact 58, wire 45, contact 42—43, winding of relay FR and the C terminal. With relay FR operated, current impulses are supplied from the B terminal of the current source over front contact 59 of relay 2R, back contact 58 of relay 1R, wire 45, contact 42—44, front contact 60 of relay 2R, back contact 61 of relay 1R, winding of motor magnet WM, 49th step contact, and to the C terminal of the current source, and the motor magnet WM operates the wiper assembly WA away from the synchronous position one step for each cycle of relay FR. As soon as the wiper assembly WA is moved one step, closing the synchronous contact ONS, a circuit is completed by which the relay FR is operated, irrespective of the circuit controlled by the track relays 1R and 2R. This latter circuit consists of B terminal, contact ONS, wires 63 and 45, contact 42—43, winding of relay FR and C terminal. This train, operating at substantially 35 feet per second, requires about 75 seconds in advancing through the measuring section W—X, which has been taken to be 2640 feet in length. On the 49th step of the wiper assembly WA, the 49th step contact is opened in the manner explained hereinbefore, stopping the operation of the motor magnet WM, but operation of the flasher relay FR is continued. It is to be noted that during this operation of the motor magnet WM, in response to the train occupying the section W—X, the 14th step contact is closed subsequent to the 14th step of the wiper assembly. In other words, the 14th step contact is closed for 35 steps (49—14) of the wiper assembly. Just after the motor magnet WM is stopped, the head end of this train enters the section X—Y, shunting the track relay 2R, so that current impulses are now supplied from the B battery terminal over synchronous contact ONS, wires 63 and 45, contact 42—44, back contact 62 of relay 2R, winding of motor magnet LM, and to the C terminal, and the motor magnet LM is active to operate the lever arm assembly LA of the time measuring device. The release of the relay 2R, in response to entry of the train into the section X—Y, opens at front contact 4 the control circuit for relay L, but that relay is now supplied with current over B terminal, 14th step contact, wire 7, front contacts 8 and 9 of relays CR1 and CR2, respectively, wires 10 and 5, front contact 6 of relay 3R, winding of the relay L, and to the C terminal. When the motor magnet LM has operated the lever assembly LA 35 steps, that is, to within 14 steps of the synchronous position, the member 14c is moved between the contact fingers 14a and 14b, opening the 14th step contact, with the result that the relay L is deenergized and releases to initiate the operation of the signal S. The motor magnet LM requires substantially 52.5 seconds to make 35 steps movement of the lever assembly, and hence the train advances about 1840 (35×52.5) feet in the section X—Y and is approximately 800 feet from the intersection when operation of the signal S is initiated. This train requires about 22 seconds to advance 800 feet, and consequently there is a warning operation of about 22 seconds of the highway crossing signal S prior to the arrival of the train at the intersection. In the event of failure of the motor magnet LM to operate the ratchet wheel 23 and, in turn, the lever assembly LA, one or the other checking relays CR1 or CR2 is deenergized and released, opening the control circuit for the relay L, with the result that operation of the signal S is at once started as a result of such failure of the device TM. When the lever assembly LA is operated to the synchronous position so that the contact ONS is open, the supply of current to the relay FR and, in turn, to the motor magnet LM ceases, the synchronous position being checked by virtue of the closing of the check contact CH to energize checking relays CR1 and CR2.

We shall next assume that a train operating at the maximum speed of 90 miles per hour approaches the highway from the left. This train, upon entering the section W—X and shunting the track relay 1R, starts the operation of the relay FR and, in turn, operation of the motor magnet WM to actuate the wiper assembly of the time measuring device, in the same manner as described for the first train. This train, operating at 90 miles per hour, consumes substantially 20 seconds in passing through section W—X and entering section X—Y, with the result that just after the wiper assembly has made its 13th step the relay 2R is released, opening front contact 60, interposed in the circuit for the motor magnet WM, and operation of the motor magnet is stopped. In this instance, release of the track relay 2R, opening front contact 4 in the control circuit for relay L, causes that relay to be deenergized and operation of the signal S initiated, since the branch path for the relay L, which includes the 14th step contact of the time measuring device, is open. Hence, for this train moving at the maximum speed of 90 miles per hour, operation of the signal S is initiated in response to entry of the train into the section X—Y, and 20 seconds operation of the signal prior to the arrival of the train at the intersection is provided, since this train requires substantially 20 seconds in moving through the sections X—Y and Y—Z. Release of relay 2R, closing back contact 62, causes the motor magnet LM to be operated, driving the lever assembly LA to the synchronous position, operation of the magnet LM being stopped when the synchronous position is reached, in the manner described for the first train. Again, it is to be noted that failure of the motor magnet LM to operate the ratchet wheel 23 and restore the time measuring device to the synchronous position results in the deenergizing of the checking relays CR1 and CR2, which relays when released render the time measuring device TM ineffective to control the operation of the signal S by virtue of the front contacts 8 and 9 of the relays being interposed in the control circuit for relay L.

An analysis of the apparatus of Fig. 1 will disclose that trains operating at speeds between the maximum speed of 90 miles per hour and the minimum speed of 24 miles per hour would cause, during the time the train occupies the section W—X, the motor magnet WM to operate the wiper assembly WA away from the synchronous position, the number of steps to which the assembly is operated prior to entry of the train into section X—Y being in accordance with the speed of the train. When the train enters the section X—Y, shunting the track relay 2R, operation of the motor magnet WM stops and the wiper assembly WA is left stationary at the position to which it has advanced, and operation of the motor magnet LM is initiated to drive the lever assembly LA toward the position of the wiper assembly to reestablish the synchronous position. Operation of the highway crossing signal is delayed until such time as the lever assembly is operated to within 14 steps of the position of the wiper assembly. Furthermore, in each case the checking relays CR1 and CR2 are so controlled as to check the synchronous position of the time measuring device and also to check proper operation of the lever assembly by the motor magnet LM, failure in the operation resulting in removing the control of the time measuring device over the highway crossing signal.

Figure 2:
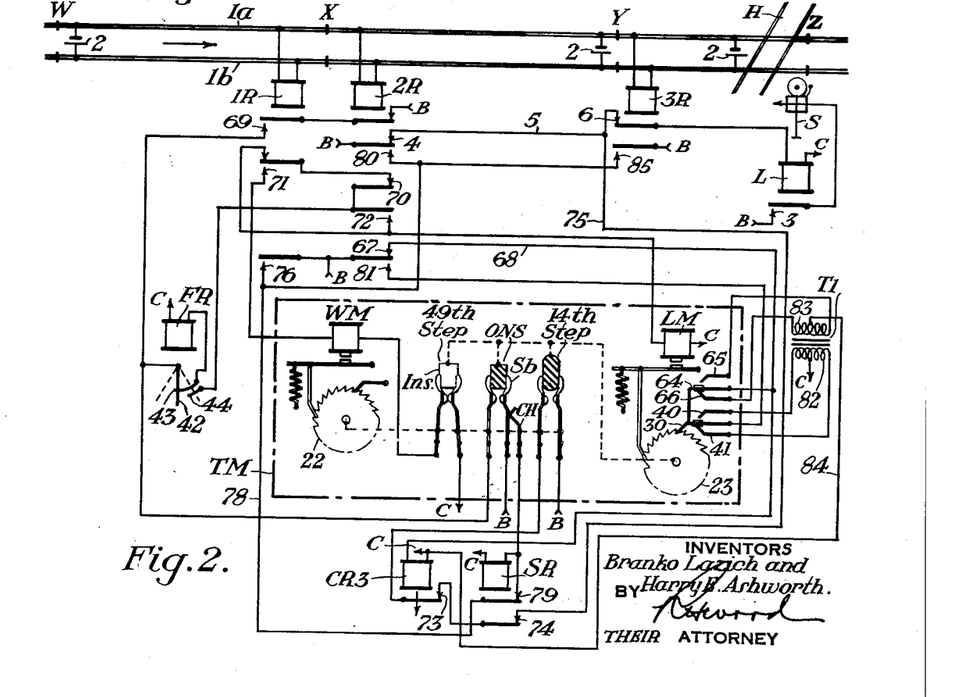

Referring to Fig. 2, the apparatus differs from that of Fig. 1 in that the retaining pawl 30 associated with the ratchet wheel 23, in addition to controlling contacts 30—40 and 30—41, has operatively connected therewith a control member 64 for governing two contacts 64—65 and 64—66, it being understood, of course, that the retaining pawl 30 and the control member 64 are insulated from each other in any convenient manner. In addition, the two checking relays CR1 and CR2 are replaced by a transformer T1, a stick relay SR and a checking relay CR3.

It is believed that an understanding of the apparatus of Fig. 2 can best be obtained from a description of its operation. Normally, that is, when the track sections are all unoccupied and the time measuring device TM occupies its synchronous position, as illustrated in Fig. 2, the stick relay SR is governed over a simple circuit including the check contact CH of the time measuring device; and the relay CR3 is energized over a circuit including the B terminal of the current source, front contact 67 of relay 2R, wire 68, winding of relay CR3, and to the C terminal of the current source.

A train approaching the highway and entering section W—X to shunt track relay IR completes at the back contact 69 of relay IR the circuit for operating the flasher relay FR and for supplying over the contact 42—44 of the relay FR current impulses to the motor magnet WM, the connection to the motor magnet including front contact 70 of relay 2R and back contact 71 of relay IR, as well as the 49th step contact of the time measuring device. The wiper assembly WA is now operated step-by-step away from the synchronous position during the time the train occupies the section W—X prior to entry of the train into the section X—Y, the operation of the motor magnet WM being stopped at the 49th step of the wiper assembly in the event the train should stop in the section W—X or should advance therethrough at a relatively low speed. When the track relay 2R is released in response to entry of the train in the section X—Y, the circuit for the motor magnet WM is opened at front contact 70 and operation of the wiper assembly is stopped. Closing of back contact 72 of relay 2R completes the circuit connection to the motor magnet LM, and the lever assembly LA is advanced step-by-step until the synchronous position is reached and the circuit for the motor magnet LM is open at the synchronous contact ONS. With relay 2R released, opening front contact 4, the control circuit for the relay L is open, but that relay is now supplied with current over the branch path including the 14th step contact of the time measuring device, front contact 73 of relay CR3, front contact 74 of relay SR, wire 75 to wire 5, and thence over front contact 6 of relay 3R, as previously pointed out. Hence, the operation of the signal S is delayed until the lever assembly LA has advanced to within 14 steps of the position of the wiper assembly and the 14th step contact is opened, providing the relays CR3 and SR are both retained energized in the meantime. Subsequent to the operation of the wiper assembly away from the synchronous position and the opening of the check contact CH, the relay SR is retained energized during the time the track section W—X is occupied over a stick circuit that includes B terminal, back contact 76 of relay IR, wire 78 and the front contact 79 and winding of the relay SR; and then over a stick circuit that includes the back contact 80 of track relay 2R and the above traced circuit when the train enters the section X—Y. A branch path including back contact 85 of relay 3R may be provided for the stick circuit of relay SR.

Subsequent to the release of the relay 2R, opening front contact 67, the relay CR3 is retained energized by operation of the ratchet wheel 23, in the following manner. Closing of back contact 81 of relay 2R completes a circuit by which the primary winding 82 of transformer T1 is supplied with current over the contacts 30—40 and 30—41. This circuit can be traced first from the B terminal over back contact 81, contact 30—41, the right-hand portion of primary winding 82 to a mid terminal, and thence to the C terminal of the current source. During the intervals the retaining pawl 30 engages the top of the teeth of the ratchet wheel 23, the circuit includes back contact 81, contact 30—40, the left-hand portion of the primary winding 82, and to the C terminal of the current source. This alternate energization of the two portions of the primary winding 82 produces an electromotive force in the secondary winding 83 of transformer T1, and current impulses are supplied therefrom to the winding of relay CR3. The circuit may first be traced from the left-hand terminal of secondary winding 83 over contact 64—66, wire 68, winding of relay CR3 and wire 84 to a mid terminal of the winding 83. During the intervals the retaining pawl 30 is raised by rotation of the ratchet wheel 23, the circuit may be traced from the right-hand terminal of secondary winding 83 over contact 64—65, and thence, as first traced, to the mid terminal of the winding 83. The parts are so constructed that the current impulses thus supplied to the winding of the relay CR3 cause current to flow in the winding always in the same direction, with the result that the relay CR3 is retained picked up by virtue of operation of the ratchet wheel 23, since the relay CR3 is provided with slow release characteristics. Failure of the motor magnet LM to operate the ratchet wheel 23 and, in turn, the lever assembly of the time measuring device, results in the relay CR3 becoming deenergized and released at the expiration of its slow release period, opening the branch path in the control circuit for the relay L. It follows, therefore, that the relay SR is effective to check the synchronous position of the time measuring device, and the relay CR3 is effective to check the proper operation of the device.

The arrangement of two synchronously operated sets of contacts with a transformer having its input controlled by one set and its output controlled by the other set is disclosed and claimed in a copending application Serial No. 210,744, filed May 28, 1938, by F. H. Nicholson and L. R. Allison for Railway traffic controlling apparatus.

It will be understood that our invention is not limited to the train speeds, length of track sections and rate of operation for the relay FR and for the time measuring device TM assumed hereinbefore, and that these various conditions may be selected as desired. Furthermore, it is to be pointed out that the motor magnet WM may be operated at one predetermined speed, and the motor magnet LM may be operated at a second and different predetermined speed, if desired.

Although we have described only two forms of apparatus embodying our invention, it is understood that various changes and modifications may be made therein within the scope of the appended claims without departing from the spirit and scope of our invention.

Having thus described our invention, what we claim is:

1. In combination, a time measuring means including a contact actuating member rotatable about an axis, a motor operatively connected with said member and effective when energized to rotate the member, means to energize at times said motor for rotating said member at a predetermined rate, a circuit controlling contact operated by said member when rotated a time interval which interval depends upon the initial position of said member with respect to said contact, another contact, means operatively connected with said member for periodically opening said other contact in response to rotation of the member to check the rate of rotation of said member, a slow acting electromagnetic device effective to operate a contact and having a predetermined release period, means including said other contact for energizing said electromagnetic device, and an operating circuit serially including said circuit controlling contact and said contact of the electromagnetic device.

2. In combination, a time measuring means including a contact actuating member rotatable about an axis, means including a motor magnet and a ratchet wheel operatively connected with said member, said means effective to rotate the member step-by-step in response to energization of the motor, means to at times energize the motor to rotate said member at a predetermined rate, a circuit controlling contact operated by said member, another contact, means operatively connected with said ratchet wheel for opening and closing said other contact each step of the ratchet wheel, a slow acting electromagnetic device, means including said other contact for energizing said electromagnetic device to check the operation of said member, and an operating circuit controlled jointly by said circuit controlling contact and said electromagnetic device.

3. In combination, a time measuring means including a contact actuating member rotatable about an axis, means including a motor magnet and a ratchet wheel operatively connected with said member, said means effective to rotate the member step-by-step in response to energization of the motor, means to at times energize the motor to rotate said member at a predetermined rate, a circuit controlling contact operated by said member, another contact, means operatively connected with said ratchet wheel for operating said other contact once each step of the ratchet wheel, a slow acting relay, circuit means including said other contact for energizing said relay periodically in response to the step-by-step movement of the ratchet wheel, and a control circuit serially including a contact of said relay and said circuit controlling contact.

4. In combination, a time measuring means including a contact actuating member rotatable about an axis, a motor operatively connected with said member and effective when energized to rotate the member, means to energize said motor at times to rotate the member a predetermined distance at a prescribed rate for closing a circuit controlling contact, a toothed wheel operatively connected with said member for rotation therewith, contact mechanism including a contact finger mounted for engagement with the teeth of said wheel to periodically operate said mechanism in response to rotation of the wheel, a slow acting electromagnetic device, means to periodically energize said device in step with operation of said contact mechanism to check the speed of rotation of said member, and an operating circuit jointly controlled by said circuit controlling contact and said device.

5. In combination, a time measuring means including a contact actuating member rotatable about an axis, a motor operatively connected with said member and effective when energized to rotate the member, means to energize said motor at times to rotate the member a predetermined distance at a prescribed rate for closing a circuit controlling contact, a toothed wheel operatively connected with said member for rotation therewith, contact mechanism including a first and a second fixed contact as well as a movable contact finger, said contact finger mounted for engagement with the teeth of said wheel to alternately engage said first and second contacts in response to rotation of said wheel, a first and a second slow acting relay, circuit means to energize said first relay including said first contact and said contact finger, other circuit means to energize said second relay including said second contact and said contact finger whereby said relays are periodically and alternately energized in response to rotation of said member, and an operating circuit serially including a contact of each of said relays as well as said circuit controlling contact.

6. In combination, a time measuring means including a contact actuating member rotatable about an axis, a motor operatively connected with said member and effective when energized to rotate the member, means to energize said motor at times to rotate the member a predetermined distance at a prescribed rate for closing a circuit controlling contact, a toothed wheel operatively connected with said member for rotation therewith, contact mechanism including a first and a second fixed contact as well as a movable contact finger, said contact finger mounted for engagement with the teeth of said wheel to alternately engage said first and second contacts in response to rotation of said wheel, a first and a second relay each provided with a predetermined slow release period, means to energize said first relay including a front contact of each of said relays and said first contact as well as the contact finger, means to energize said second relay including a front contact of each of said relays and said second contact as well as the contact finger, other means to initially energize said relays whereby said relays are retained picked up in response to rotation of said member at its predetermined speed but are released when said member is rotated at a lower speed, and an operating circuit including a front contact of each of said relays as well as said circuit controlling contact.

7. In combination, a time measuring means including a first and a second member independently rotatable in the same direction about a common axis at predetermined speeds, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at its predetermined speed during the lapsed time of an event and then at the expiration of said event to rotate the second member at its predetermined speed to operate said circuit controlling contact and to reestablish the synchronous position of said members, contact mechanism mounted for operation in response to rotation of said second member, a relay, means including said contact mechanism to effectively energize said relay in response to operation of said mechanism to check rotation of said second member, and an operating circuit controlled jointly by said relay and said circuit controlling contact.

8. In combination, a time measuring means including a first and a second member independently rotatable in the same direction about a common axis at predetermined speeds, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at its predetermined speed during the lapsed time of an event and then at the expiration of said event to rotate the second member at its predetermined speed to operate said circuit controlling contact and to reestablish the synchronous position of the members, contact mechanism mounted for periodic operation in response to rotation of said second member, a slow acting relay, means including said contact mechanism to periodically energize said relay in step with the operations of the contact mechanism to check rotation of said second member at its predetermined speed, and an operating circuit including said circuit controlling contact and a contact operated by said relay.

9. In combination, a time measuring means including a first and a second member independently rotatable in the same direction about a common axis at predetermined speeds, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at its predetermined speed during the lapsed time of an event and then at the expiration of said event to rotate the second member at its predetermined speed to operate said circuit controlling contact and to reestablish the synchronous position of the members, a toothed wheel rigid with said second member for rotation therewith, contact mechanism including a contact finger mounted to engage the teeth of said wheel to alternately close a first and a second contact in response to rotation of the wheel, a first and a second slow acting relay, circuit means including said first contact to energize said first relay, other circuit means including said second contact to energize the second relay whereby said relays are periodically energized in response to rotation of said wheel to check operation of said second member, and an operating circuit controlled jointly by said relays and said circuit controlling contact.

10. In combination, a time measuring means including a first and a second member independently rotatable in the same direction about a common axis at predetermined speeds, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at its predetermined speed during the lapsed time of an event and then at the expiration of said event to rotate the second member at its predetermined speed to operate said circuit controlling contact and to reestablish the synchronous position of the members, a check contact operated by said members and closed only in the synchronous position, contact mechanism mounted for periodic operation in response to rotation of said second member, a slow acting relay, a pickup circuit for said relay including said check contact, a stick circuit for said relay including said contact mechanism, and an operating circuit controlled jointly by said circuit controlling contact and a contact of said relay.

11. In combination, a time measuring means including a first and a second member independently rotatable in the same direction about a common axis at predetermined speeds, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at its predetermined speed during the lapsed time of an event and then at the expiration of said event to rotate the second member at its predetermined speed to operate said circuit controlling contact and to reestablish the synchronous position of the members, a check contact operated by said members and closed only in the synchronous position, contact mechanism including a first and a second contact and mounted for periodically and alternately operating said contacts in response to rotation of said second member, a first and a second slow release relay, pickup circuit means for said relays including said check contact, a stick circuit for the first relay including said first contact, a stick circuit for the second relay including said second contact, whereby said relays effectively check the operation of the time measuring means, and an operating circuit controlled jointly by said circuit controlling contact and said relays.

12. In combination, a time measuring means including a first and a second member independently rotatable in the same direction about a common axis at predetermined speeds, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at its predetermined speed during the lapsed time of an event and then at the expiration of said event to rotate the second member at its predetermined speed to operate said circuit controlling contact and to reestablish the synchronous position of the members, a check contact operated by said members and closed only in the synchronous position, contact mechanism including a first and a second pair of contacts and mounted for periodically and alternately operating the contacts of each of said pair of contacts in response to rotation of said second member, a transformer, a slow acting relay, means including said first pair of contacts and the primary winding of said transformer as well as a current source to induce periodic electromotive forces in the secondary winding of the transformer in response to rotation of the second member, means to connect a winding of said relay with said second winding and including said second pair of contacts whereby said relay is effectively energized by operation of said second member, another relay, means to energize said other relay including said check contact whereby said other relay is effective to check the synchronous position of the members, and an operating circuit controlled jointly by said circuit controlling contact and said slow acting and said other relays.

13. In combination, a time measuring means including a motor actuated member adapted for rotation at a predetermined rate in response to a predetermined energization of the motor, control means effective at times to provide said predetermined energization for said motor, a contact mechanism operatively connected with said member and including a first and a second pair of contacts and disposed for periodically and alternately operating the contacts of each of said pair of contacts in response to movement of said member, a transformer, a slow acting relay, means including said first pair of contacts and the primary winding of the transformer as well as a source of direct current for inducing electromotive forces in the secondary winding of the transformer in response to movement of said member, and means to connect a winding of the relay with said secondary winding and including said second pair of contacts to periodically energize said relay by the electromotive forces induced in said secondary winding for checking the rate of rotation of said member.

14. In combination, a time measuring means including a contact controlling rotatable member, an operating circuit governed by a contact of said member, a ratchet wheel in fixed relation with said member, a motor magnet operatively connected with said ratchet wheel, means effective at times to periodically energize said motor magnet for actuating said ratchet wheel step-by-step to rotate the member, contact mechanism including a first and a second pair of contacts and provided with a control element engaging the teeth of said ratchet wheel for alternately operating the contacts of each pair of contacts in response to each step of the ratchet wheel, a transformer, a slow acting relay, means including said first pair of contacts and the primary winding of the transformer as well as a source of direct current to induce electromotive forces in the secondary winding of the transformer in response to movement of the ratchet wheel, means to connect a winding of said relay with said secondary winding and including said second pair of contacts to energize said relay in response to movement of the ratchet wheel to check the rotation of said member, and means controlled by said relay for at times rendering said member ineffective to govern said operating circuit.

15. In combination, a time measuring means including a contact actuating member rotatable about an axis, a motor operatively connected with said member and effective when energized to rotate the member, means to provide at times a given energization of said motor for rotating said contact actuating member at a predetermined rate, a circuit controlling contact operated by said member when rotated a time interval which interval depends upon the initial position of said member with respect to said contact, another contact, means operated by the rotation of said contact actuating member to periodically open said other contact to check the rate of rotation of said member by the periods said other contact is held open, a slow acting electromagnetic device effective to operate a contact and provided with a predetermined operating period, means including said other contact for energizing said electromagnetic device, and an operating circuit serially including said circuit controlling contact and said contact of the electromagnetic device.

16. In combination, a time measuring means including a contact actuating member rotatable about an axis, means including a motor magnet operatively connected with said member through a ratchet wheel in fixed relation with said member, said means effective to rotate the member step-by-step in response to energization of the motor, means to at times energize the motor to rotate said member at a predetermined rate, a circuit controlling contact adaptable of operation by said member, another contact, means actuated by rotation of said ratchet wheel for alternately opening and closing said other contact, a slow acting electromagnetic device, means including said other contact for energizing said electromagnetic device to check the rate of rotation of the ratchet wheel and circuit actuating member, and an operating circuit controlled jointly by said circuit controlling contact and said electromagnetic device.

17. In combination, a time measuring means including a first and a second member independently rotatable in the same direction about a common axis, said members having a synchronous position with respect to each other which may occur at any angular position, a circuit controlling contact operated jointly by said members and closed when the members occupy a predetermined position with respect to each other, motor actuating means operatively connected to said members, control means to effectively energize said motor actuating means to rotate the first member away from the synchronous position at a predetermined rate during the lapsed time of an event and then at the expiration of said event to rotate the second member at a predetermined rate to operate said circuit controlling contact and to reestablish the synchronous position of said members, contact mechanism mounted for actuation by the rotation of said second member to alternately open and close a check contact, a slow acting relay controlled over said check contact to check the rate of rotation of said second member, and an operating circuit controlled by said relay.

18. In combination, a time measuring means including a contact actuating member rotatable about an axis, a motor operatively connected with said member and effective when energized to rotate the member, means to provide at times a given energization of said motor for rotating said contact actuating member at a predetermined rate, a circuit controlling contact operated by said member when rotated a time interval which interval depends upon the initial position of said member with respect to said contact, a checking mechanism mounted for actuation by the rotation of said member to provide time spaced impulses of current the rate of which impulses depends upon the rate of rotation of said member, a slow acting relay controlled by said time spaced impulses of current, and an operating circuit controlled by said relay.

19. In combination, a time measuring means including a contact actuating member rotatable about an axis, a motor operatively connected with said member and effective when energized to rotate the member, means to energize at times said motor for operating said motor at a predetermined rate, a circuit controlling contact operated by said member when rotated a time interval which interval depends upon the initial position of said member with respect to said contact, another contact, means operatively connected with said motor for periodically opening said other contact in response to operation of said motor to check the rate of operation of said motor, a slow acting electromagnetic device effective to operate a contact and having a predetermined release period, means including said other contact for energizing said electromagnetic device, and an operating circuit serially including said circuit controlling contact and said contact of said electromagnetic device.

BRANKO LAZICH.
HARRY E. ASHWORTH.